United States Patent [19]

Large

[11] 4,295,626
[45] Oct. 20, 1981

[54] RESILIENT MOUNTING FOR A RECLINING SEAT

[76] Inventor: Eddie A. J. Large, Bayton Rd, Exhall, Coventry, West Midlands, England, CV7 9DT

[21] Appl. No.: 25,368

[22] Filed: Mar. 30, 1979

[51] Int. Cl.³ .............................................. A47B 1/02
[52] U.S. Cl. .................................... 248/575; 297/304; 297/333
[58] Field of Search ............... 248/575, 542, 543, 545, 248/608; 296/285, 304, 333, 303; 16/75; 299/304

[56] References Cited

U.S. PATENT DOCUMENTS

| 5,11,881 | 1/1894 | Dennis | 297/333 |
| 2,778,409 | 1/1957 | Soderberg | 297/304 |
| 2,784,767 | 3/1957 | Soderberg | 248/575 X |
| 2,845,991 | 8/1958 | Soderberg | 248/575 X |
| 3,438,152 | 4/1969 | Cadiou | 16/75 X |
| 3,813,073 | 5/1974 | Mohr et al. | 248/608 |
| 4,214,726 | 7/1980 | Karrip et al. | 248/575 |

FOREIGN PATENT DOCUMENTS

| 717014 | 1/1942 | Fed. Rep. of Germany . |
| 1429333 | 11/1968 | Fed. Rep. of Germany . |
| 766182 | 1/1957 | United Kingdom ................... 16/75 |
| 811283 | 7/1957 | United Kingdom . |
| 1161464 | 8/1969 | United Kingdom . |
| 1322593 | 7/1973 | United Kingdom . |
| 1425363 | 2/1976 | United Kingdom . |
| 1487273 | 9/1977 | United Kingdom . |

Primary Examiner—James T. McCall
Attorney, Agent, or Firm—Hauke and Patalidis

[57] ABSTRACT

A resilient mounting for a reclining seat, the mounting including a first member to be secured to a supporting base for the seat, a second member to be secured to the seat and which is pivotally connected to the first member, and a torsion bar which forms the pivot for the two members and which provides a return bias when one of the members is tilted relative to the other.

10 Claims, 7 Drawing Figures

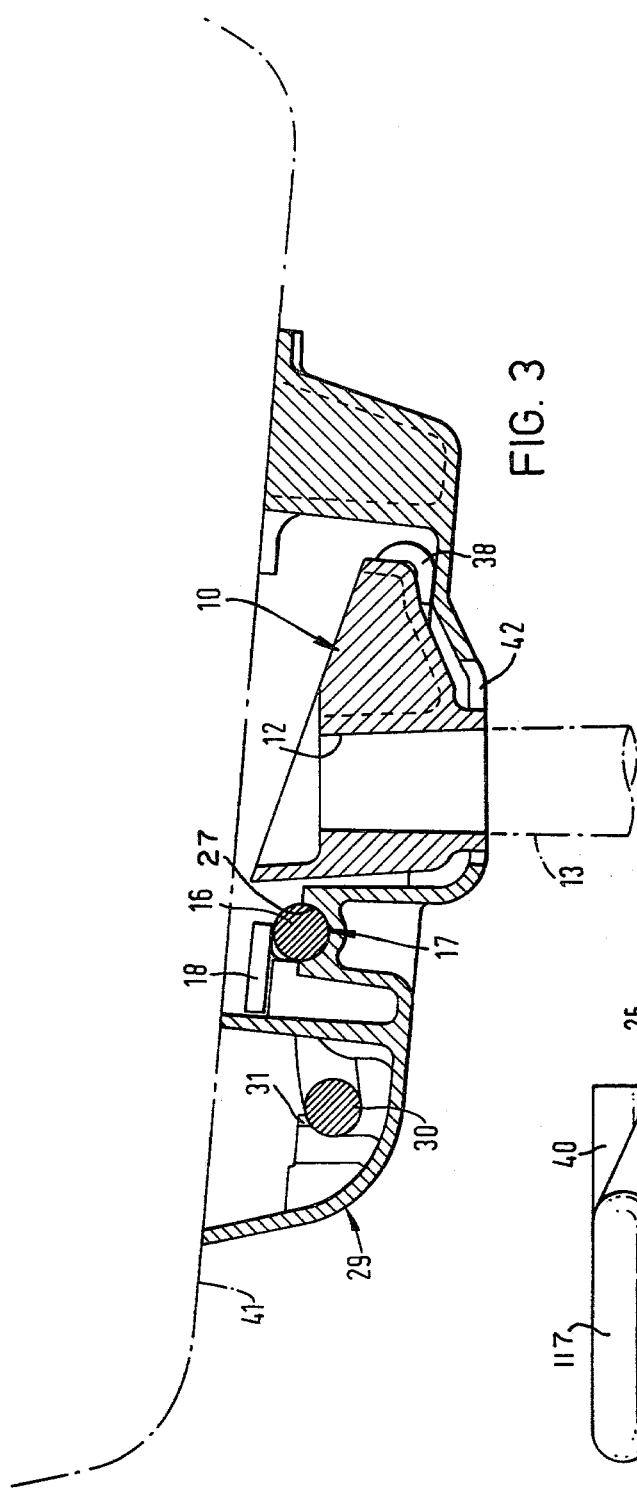

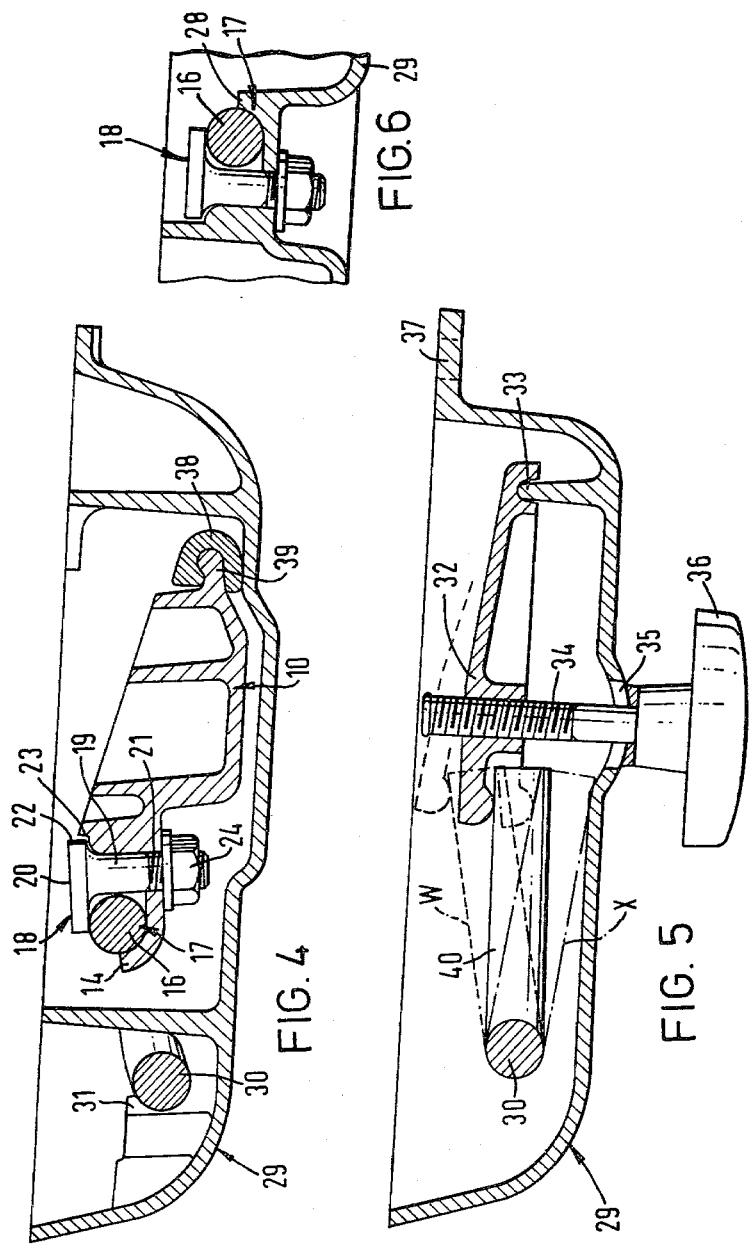

RESILIENT MOUNTING FOR A RECLINING SEAT

BACKGROUND OF THE INVENTION

The invention relates to a resilient mounting for a reclining seat which can apply a return bias to the seat when the seat is tilted relatively to a supporting base.

Many different types of resilient mountings for reclining seats have been proposed hitherto, some of which utilize one or more torsion bars to provide the return bias. The mountings usually include two pivotally interconnected members one of which carries the seat and the other of which attaches to the supporting base, the torsion bar merely serving to provide the return bias. Examples of such mountings are described in British Pat. Nos. 1,322,593; 1,161,464 and 811,283 as well as in others mentioned below. In each of those mountings the torsion bar providing the return bias passes through bearings provided between the two members to enable one to pivot relatively to the other. This arrangement necessitates the use of special bearings which not only interconnect the relatively tiltable members but which have also an internal bore shaped to receive the the torsion bar. The torsion bar is normally of square cross-section and so the bearings have a cylindrical outer periphery, around which one of the members can rotate, and a square cross-section internal bore. The use of such bearings not only increases the overall cost of production but makes assembly difficult.

In mechanisms such as described in British Pat. No. 1,425,363, the use of such bearings is avoided by utilizing coaxial bearing tubes arranged one within the other on the two members. The torsion bar passes coaxially through the innermost tube and is arranged to apply a return bias when one of the members is tilted relative to the other. Whilst the use of tubes avoids the need to manufacture special bearing elements, the product has to be assembled accurately in view of the need to align the various tubes coaxially.

An improved tilting mounting has been proposed in British Pat. No. 1,487,273. However the mounting still requires bearings for providing the pivotal connection between the fixed and tilting members. The bearings rotatably support tubes secured to the tilting member and the tubes house springs for providing the return bias. With this fitting, accurate alignment of the tubes is necessary during manufacture to ensure free pivoting of the tubes on the bearings.

The invention as claimed is intended to mitigate the foregoing disadvantages and, according to the invention there is provided a resilient mounting for a reclining seat, the mounting including a first member to be secured to a base for the seat, a second member to be secured to the seat and which is pivotally connected to the first member, and a torsion bar for providing a return bias when one of the members is tilted relative to the other, the resilient mounting being characterised in that the torsion bar interconnects the two members and forms the pivot.

The advantage offered by the invention is that the torsion bar not only provides the return bias but also forms the pivot, thus avoiding the need for bearings in addition to the torsion bar for pivotally interconnecting the first and second members. Therefore the resilient mounting is less complex than resilient mountings previously proposed.

In the prior patents referred to, the torsion bars described take up a considerable amount of space beneath the seat because they are straight from end to end. As a result, the torsion bars require long housings to accommodate them. Where the housings are in the form of steel tubes or castings the overall weight of the mountings can be considerable. Also, elongated housings projecting from a central assembly of first and second pivotally interconnected members tend to make the mounting somewhat cumbersome. In a preferred resilient mounting according to the invention, the torsion bar is made from a metal bar which is bent to form a first elongate portion which provides the pivot and a second elongate portion which extends generally alongside the first portion. The first portion may have a free-end portion which extends substantially at right angles thereto and abuts reaction means on the first member, and the second portion may also have a free-end portion extending substantially at right angles thereto and which abuts reaction means on the second member. Thus, the torsion bar is bent back on itself and does not require an elongated housing as would be the case with a completely straight torsion bar formed from a similar length of metal bar. This enables the torsion bar to be contained within a very compact housing beneath the seat. Such a compact housing results in a resilient mounting of comparatively less weight.

The use of a straightforward abutment surface on the first member leads to a particularly simple construction whereas, in some of the prior art devices, specially shaped retainers having square cross-section bores are necessary to provide reaction for square cross-section torsion bars.

In several of the prior art mountings, many of the moving parts are easily accessible even when the mounting is secured to the seat. Whilst this might appear prima facie advantageous, it is undesirable in at least two aspects namely:
(i) the user can be pinched by relatively moving members and
(ii) the mechanism can become heavily caked with dust particularly where the moving parts are greased.

However, in the preferred embodiment of the invention, the second member is in the form of an open-topped tray which fixes to the seat so that the seat covers the open top and which wholly contains the first member, said first member, when the second member is secured to the seat, being accessible through an aperture in the floor of the second member, said aperture being in alignment with a portion of the first member which is to be secured to the supporting base for the seat. In this manner, the working parts are entirely housed within the second member and will, therefore, remain clean throughout the working life of the mounting. Also, with such an arrangement, it is almost impossible for the user to be pinched by relatively moving parts.

The second member can easily be made in tray-like form by using casting methods such as pressure die casting. This is advantageous over many of the prior art mountings which are in the form of heavy welded fabrications. The first member can also be a die casting.

Preferably the metal bar forming the torsion bar is bent so that the elongate first and second portions converge in the direction away from the bend. Such an arrangement causes the torsion applied to the torsion bar to be distributed substantially along the entire bar rather than being concentrated to a large extent at the bend. In this manner, the endurance of the torsion bar is greater than if, say, the first and second portions were parallel.

In another embodiment, the torsion bar may comprise a metal bar which is bent to form an elongate portion which provides the pivot and has two free-end sections which are bent substantially at right angles thereto, one of said free end sections abutting reaction means on the first member and the other free-end section abutting reaction means on the second member. Such an arrangement provides a simpler form of torsion bar and still results in a compact mounting.

Straightforward assembly of resilient mountings is an essential prerequisite for efficient production. Where torsion bars have to be fed through a number of aligned bores, some of which are of square cross-section, there are assembly difficulties. A preferred form of mounting overcomes this problem to a large extent by providing cradle-like mounting means on the first and second members which locate the portion of the torsion bar which provides the pivot, the pivot-forming portion of the torsion bar being retained in the cradle-like mounting means by detachable retainers.

In order to ensure that the cradle-like mountings provide maximum bearing area, the cradle-like mountings on the first and second members provide aligned bearing surfaces which engage the pivot-forming portion of the torsion bar over the majority of its length.

A resilient mounting for a reclining seat in accordance with the invention will now be described by way of example with reference to the accompanying drawings in which:

BRIEF DESCRIPTION OF THE DRAWING

FIG. 2 is an end elevation of the torsion bar as seen from line 2—2 of FIG. 1 prior to assembly in the mounting, FIGS. 3 to 6 are cross-sections of the mounting shown in FIG. 1 on the lines 3—3, 4—4, 5—5, 6—6 respectively in FIG. 1.

DETAILED DESCRIPTION OF THE PREFERRED EMBODIMENTS

Figure 1:
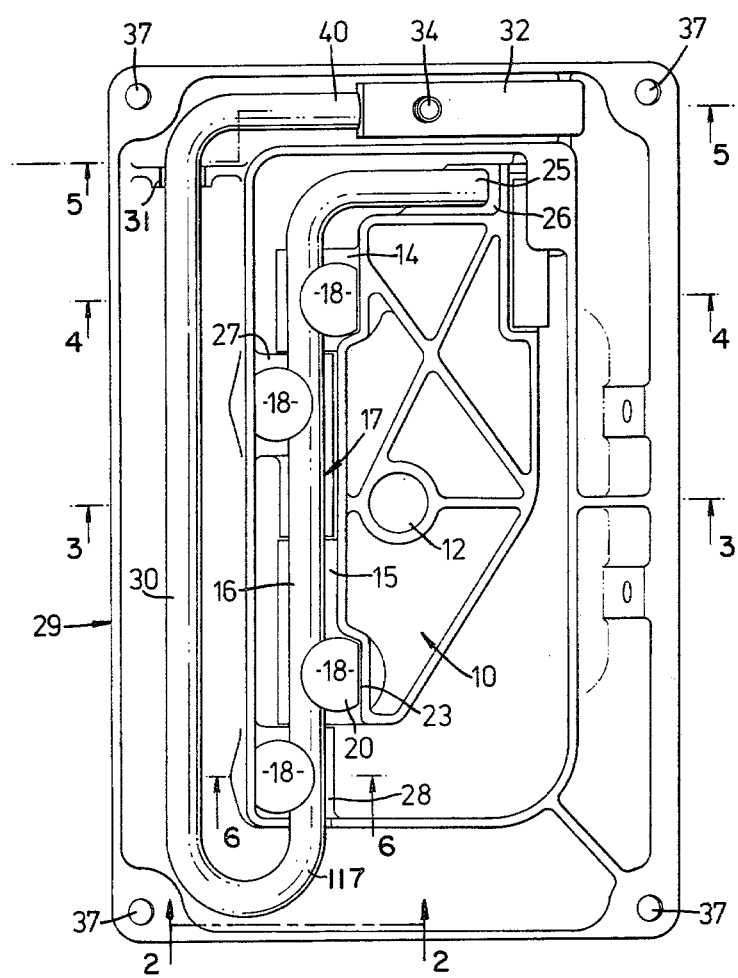
FIG. 1 is a plan view of a preferred form of mounting in accordance with the invention.

Referring firstly to FIGS. 1 to 5, a fixed casting 10 constituting the aforesaid first member, has a tapered bore 12 therein for receiving the upper end 13 (shown in broken lines in FIG. 3) of a seat supporting pillar of known kind.

The fixed casting 10 has two cradles 14, 15 projecting from the left hand side thereof as viewed in the drawings which receive a first portion 16 of a torsion bar 17. The first portion 16 of the torsion bar is retained rotatably in the cradles 14, 15 by two clamps 18. As shown in FIG. 4, each clamp 18 comprises a screw-threaded shank 19 which passes through a bore 21 in the fixed casting and which has a head 20. The head 20 is formed with a flat 22. The flat 22 cooperates with an adjacent surface 23 of the fixed casting to prevent the shank 19 from rotating when a nut 24 is screwed thereon to hold the clamp in place.

The torsion bar 17 is formed by bending a circular cross-section steel bar so as to form the first portion 16 and a second portion 30. The bar is bent at 117 through slightly more than 180° to form the portions 16, 30 and, as shown in FIG. 1, the first and second portions converge in the direction away from the bend 117. In use, it has been found that the convergent arrangement assists in distributing torsion substantially along the entire torsion bar so that undue stress is not concentrated at the bend 117. By doing this, the working life of the torsion bar is increased and there is little likelihood of it fracturing at the bend 117. The bent torsion bar enables the mounting to be particularly compact. This is advantageous over prior art mountings in which the torsion bar projects from the sides of the mounting within tubular housings.

The first portion 16 of the torsion bar 17 has a free-end section 25 bent at right angles thereto which overlies a reaction surface abutment 26 on the fixed casting 10.

The first portion 16 of the torsion bar 17 is rotatably mounted in further cradles 27, 28 on a movable casting 29 constituting the aforesaid second member. The cradle 27 projects with working clearance into the space between cradles 14, 15 on the fixed casting 10. The first portion 16 of the torsion bar 17 is retained in the cradles 27, 28 by further clamps 18 (see FIG. 6). Substantially the full length of the torsion bar first portion 16 is supported by the cradles so as to provide maximum bearing area.

The second portion 30 of the torsion bar passes through a channel 31 in the movable casting 29 and has a free-end section 40 bent at right angles thereto which passes beneath one end of a load adjustment arm 32 in the movable casting.

As shown in FIG. 2, the free-end section 25, prior to the torsion bar being stressed in the mounting, is inclined to a common plane containing the remainder of the torsion bar. The unstressed position of the section 40 when the torsion bar is assembled is indicated in broken lines at W in FIG. 5. The adjustment arm 32 is pivoted at its opposite end on a fulcrum 33, as shown in FIG. 5, and threadedly engages an adjustment screw 34 rotatably mounted in a slot 35. The lower end of the screw 34 is provided with a handwheel 36. The movable casting 29 is formed with apertures 37 at its corners for receiving screws by which it can be attached to the bottom of a seat 41 indicated in broken lines in FIG. 3.

The resilient mounting is assembled as follows:

The first portion 16 of the torsion bar 17 is placed in the cradles 14, 15 of the fixed casting 10 and the clamps 18 are installed so as to hold the first portion 16 in position. The fixed casting 10 is then placed inside the movable casting 29 so that the cradles 14, 15 align with the cradles 27, 28, and the unsupported lengths of the first portion 16 lie in the cradles 27, 28. The other two clamps 18 are then installed so as to hold the first portion 16 in the latter cradles. The adjustment arm 32 is then brought into position on top of the free-end section 40 and urged downwardly by the screw 34 to pre-load the torsion bar. Assembly is then complete and the mounting is ready for use. The absence of separate bearing elements in the mounting assists assembly and it is unnecessary to align numerous apertures for receiving the torsion bar as in the prior art.

The normal rake of the seat will be about 5° as shown in FIG. 3. The movable casting 29 can be tipped clockwise as viewed in FIG. 3 relative to the fixed casting 10 through approximately 15°, the first portion 16 of the torsion bar 17 forming the pivot. Tipping movement of the movable casting 29 winds up the torsion bar 17 which applies a return bias to the movable casting. The magnitude fo the return bias can be varied by means of the adjustment screw 34. Thus by moving the adjustment of the arm 32 from the full line position shown in FIG. 5 to the broken line position X, the return bias will be increased.

In order to prevent the movable casting 29 from knocking against the fixed casting 10 during movement thereby creating noise, a resilient cushion 38 is provided on a lip 39 projecting from the fixed casting. Of course, the cushion could quite easily be mounted on the movable casting instead.

The movable casting 29 is in the form of an open topped tray which contains the fixed casting 10. The upper end 13 of the seat pillar extends through an aperture 42 in the bottom of the movable casting 29 and locates in the fixed casting 10. When the movable casting is secured to the seat the seat closes the top and prevents ingress of dust.

Figure 7:
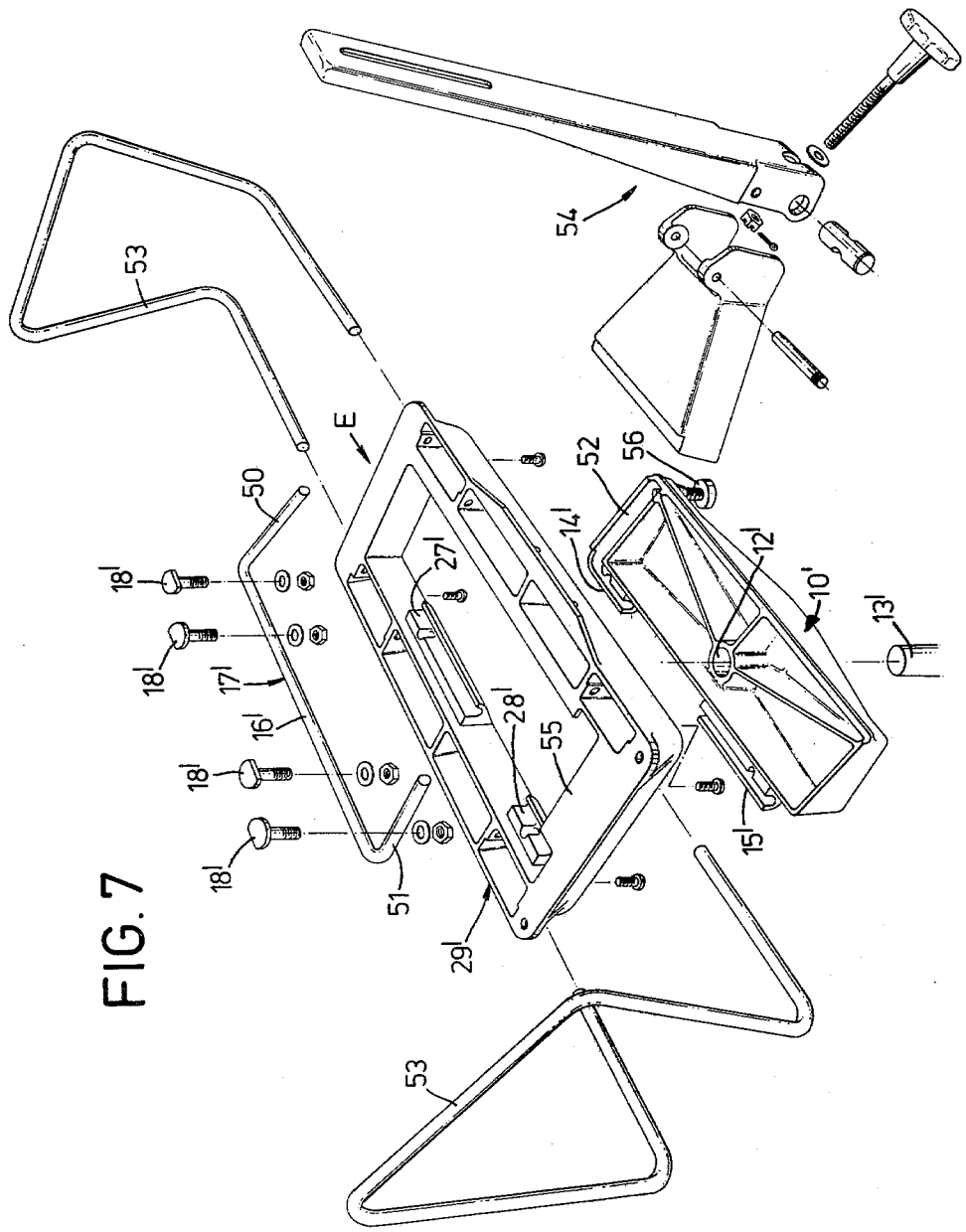
FIG. 7 is an exploded perspective view of an alternative form of mounting.

Reference will now be made to FIG. 7 in which parts corresponding to parts in FIGS. 1 to 6 carry the same reference numerals followed by a prime.

A fixed casting 10' has a bore 12' therein for receiving the upper end 13' of a seat supporting pillar (not shown).

The fixed casting 10' is formed with two cradles 14', 15' which receive a first portion 16' of a torsion bar 17'. The first portion 16' is retained rotatably in the cradles by two clamps 18' identical to the clamps 18 of FIG. 1.

The first portion 16' of the torsion bar 17' has free-end sections 50, 51 at right angles thereto, the section 50 being bent downwards out of the plane containing the remainder of the torsion bar.

The first portion 16' of the torsion bar 17' is rotatably mounted in further cradles 27', 28' on a movable casting 29' which, in use, is attached to the bottom of a seat (not shown). The cradle 15' projects with working clearance into the space between the cradles 27', 28'. The first portion 16' is retained in the cradles 27', 28' by clamps 18' and the section 50 locates in an extension 52 of cradle 14'. The section 51 of the torsion bar engages beneath an abutment 55 on the movable casting 29'. Adjustment means in the form of a generally vertical screw 56 is provided in the fixed casting 10' and projects into the cradle extension 52 beneath the torsion bar section 50. Rotation of the screw so as to move it upwardly bends the section 50 clockwise as viewed in the direction of arrow E to pre-load the torsion bar 17'. Tipping movement of the movable casting 29' anti-clockwise when viewed in the direction of arrow E twists the torsion bar 17' which applies a return bias. A stop (not shown) determines the initial relative positions of the fixed and movable castings.

The movable casting 29' may carry armrest supports 53 and a backrest support indicated generally at 54.

As will be appreciated, the use of a torsion bar as shown in FIG. 7 also enables the mechanism to be less complex than those proposed in the prior art.

The castings described are preferably pressure die cast from aluminium and can thereby be produced easily in large quantities. This is highly advantageous over prior mountings which include welded plate-type fabrications. However, it should be understood that the fixed and movable parts 10, 10' and 29, 29' could be otherwise formed.

With the present invention, pivot pins or tubes necessary in addition to a torsion bar in prior art mechanisms are not required because the torsion bar 17 or 17' serves both as the pivot and as the means for applying a return bias. Thus, a resilient mounting made in accordance with the present invention is of simpler construction than those proposed hitherto.

What I claim as my invention and desire to secure by Letters Patent of the United States is:

1. A resilient mounting for a reclining seat, said mounting comprising a first member to be secured to a supporting base for the seat, a second member to be secured to the seat and a torsion bar pivotally connecting the second member to the first member, said torsion bar forming a pivot for the two members and providing a return bias when one of the members is tilted relative to the other, said torsion bar having a first bent over free end section which reacts against the first member, a second bent over free end section which reacts against the second member and an elongate rectilinear portion intermediate said free end sections which forms the pivot for the two members, aligned cradles on said first and second members which locate a portion of said elongate rectilinear portion of said torsion bar which forms the pivot, and retainers on said first and second members for rotatably retaining said elongate portion of the torsion bar in said cradles.

2. A resilient mounting according to claim 1, in which the torsion bar comprises a metal bar which is bent to form a second elongate portion which extends generally alongside the first said elongate portion.

3. A resilient mounting according to claim 2, in which the first said elongate portion of the torsion bar has said first free-end section which extends substantially at right angle thereto and abuts a reaction means on the first member, and the second said elongate portion of the torsion bar has said second free-end section extending substantially at right angle thereto and which abuts reaction means on the second member.

4. A resilient mounting according to claim 3, in which the reaction means on the first member is a fixed surface on the first member and the reaction means on the second member is adjustable relative to the second member to enable the torsion bar to be torsionally pre-loaded.

5. A resilient mounting according to claim 3, in which the free-end section of the first said elongate portion of the torsion bar prior to assembly into the mounting is inclined to a common plane containing the remainder of the torsion bar.

6. A resilient mounting according to claim 1, in which the second member is in the form of an open top tray affixed to the bottom of the seat so that the seat covers the open top and said first member contained in said open top, said first member being accessible through an aperture in the bottom of the second member, said aperture being in alignment with a portion of the first member which is to be secured to the supporting base for the seat.

7. A resilient mounting according to claim 2, in which the metal bar forming the torsion bar is bent so that the resulting elongate first and second portions converge in the direction away from the bend.

8. A resilient mounting according to claim 1, in which the torsion bar comprises a metal bar which is bent to form an elongate portion which provides the pivot and two free-end sections which are substantially at right angles thereto, one of said free-end sections abutting reaction means on the first member and the other free-end section abutting reaction means on the second member.

9. A resilient mounting according to claim 8, in which the reaction means on the first member is adjustable relative to the first member to enable the torsion bar to be torsionally pre-loaded, and the reaction means on the second member is a fixed surface.

10. A resilient mounting according to claim 1, in which the cradles on the first and second members provide aligned bearing surfaces which engage the pivot-forming portion of the torsion bar over the majority of its length.

* * * * *